(12) United States Patent
Kagan et al.

(10) Patent No.: US 6,447,866 B1
(45) Date of Patent: Sep. 10, 2002

(54) FRICTIONALLY WELDED THERMOPLASTIC ARTICLES HAVING IMPROVED STRENGTH

(75) Inventors: Val A. Kagan, Morris Plains, NJ (US); Chul S. Lee, Northville, MI (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/470,709

(22) Filed: Dec. 23, 1999

(51) Int. Cl.$^7$ ................................................ B32B 3/10
(52) U.S. Cl. .......................................... 428/58; 428/57
(58) Field of Search ............................. 428/58, 60, 57; 156/73.5

(56) References Cited

U.S. PATENT DOCUMENTS

| | | | |
|---|---|---|---|
| 4,058,421 A | * 11/1977 | Summo | 156/73.5 |
| 4,601,927 A | 7/1986 | Durfee | 428/35 |
| 5,540,808 A | * 7/1996 | Vincent et al. | 156/73.1 |
| 5,874,146 A | 2/1999 | Kagan et al. | 428/57 |

FOREIGN PATENT DOCUMENTS

| | | |
|---|---|---|
| FR | 2713540 | 6/1995 |
| GB | 2273076 | 6/1994 |
| GB | 2325638 | 12/1998 |
| JP | 7-186263 | 12/1993 |
| JP | 6-285994 | 10/1994 |
| JP | 9-164595 | 6/1997 |
| JP | 10-80952 | 3/1998 |
| WO | WO 97/17189 | 5/1997 |

OTHER PUBLICATIONS

V.K. Stokes, Vibration Welding of Thermoplastics, Part I: Phenomenology of the Welding Process, *Polymer Engineering and Science*, 28, 718 (1988), No month.
V. K. Stokes, Vibration Welding of Thermoplastics, Part II:Analysis of the Welding Process *Polymer Engineering and Science*, 28, 728 (1988), No month.
V.K. Stokes, Vibration Welding of Thermoplastics Part IV: Strengths of Poly(Butylene Terephthalate), Polyetherimide, and Modified Polyphenylene Oxide Butt Welds, *Polymer Engineering and Science*, 28, 998 (1988), No month.
V. Kagan et al., The Optimized Performance of Linear Nylon 6 and Nylon 66 Butt Joints, Plastics—Racing into the Future, *Proceedings of the SPE 54$^{th}$ Annual Technical Conference and Exhibits*, 1266–1274 (1996), No month.
Specification for Standardized Ultrasonic Welding Test Specimens for Thermoplastics *American Welding Society, AWS G1.2M/G1.2: 1999, An American National Standard* , No month.

* cited by examiner

Primary Examiner—Alexander S. Thomas
(74) Attorney, Agent, or Firm—Roger H. Criss

(57) ABSTRACT

A frictionally welded, filled thermoplastic article is strengthened by restricting lateral flow of molten material out of the gap between the workpieces, so that a molten pool of substantial depth is maintained from the beginning of melting to the onset of solidification. The restriction to lateral flow of material is provided by dams (projections) of essentially rectangular cross-section at each lateral edge of one of the workpieces, while the other workpiece has a substantially flat mating surface.

6 Claims, 10 Drawing Sheets

Figure 1
Fig. 1a
Fig. 1b
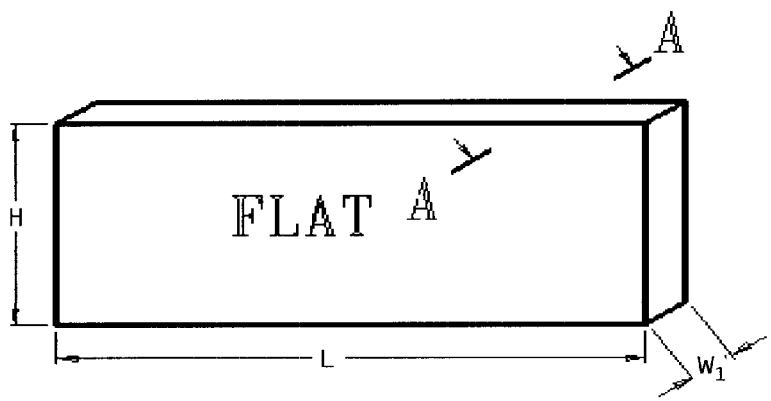 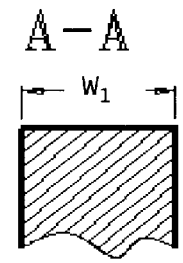

Figure 2
Fig. 2a
Fig. 2b
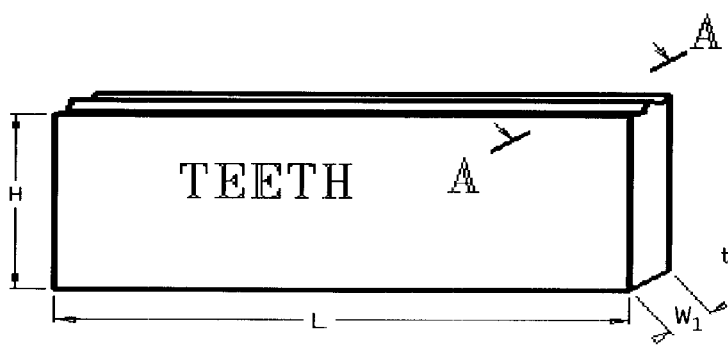
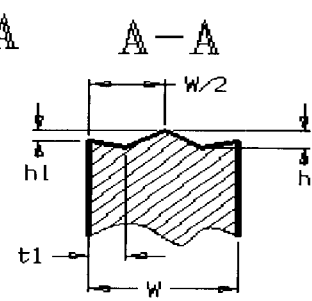

Fig. 3a                                    Fig. 3b

Figure 7
Fig. 7a
Fig. 7b
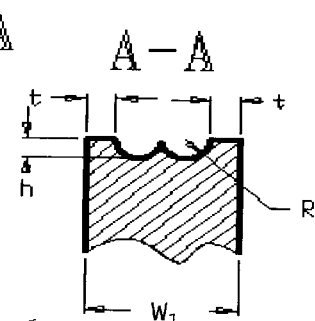
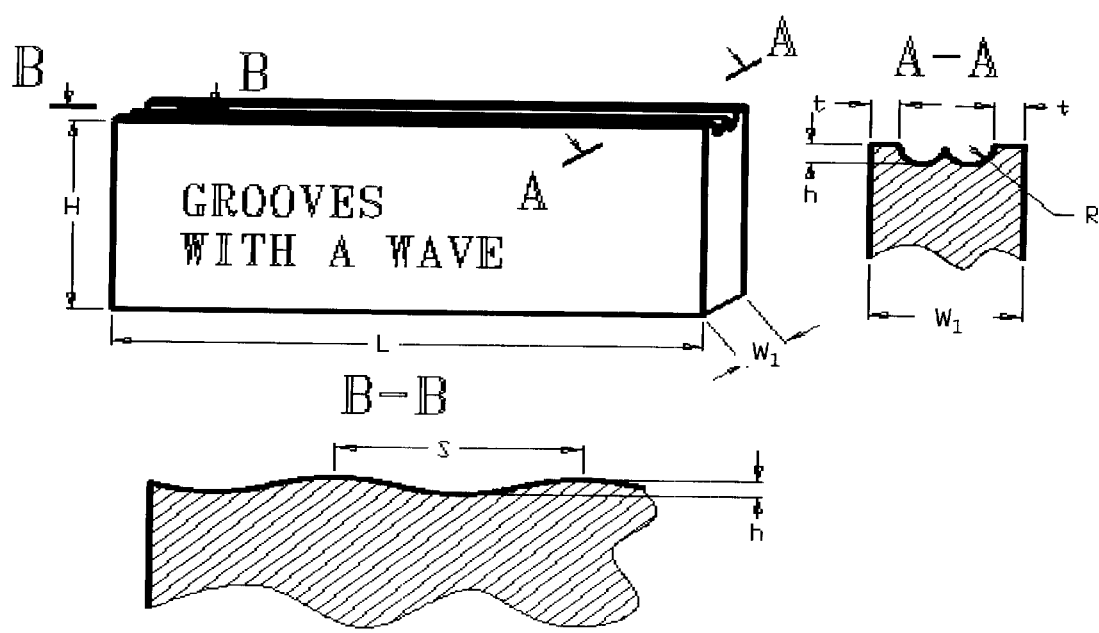
Fig. 7c

Figure 8
Fig. 8a
Fig. 8b
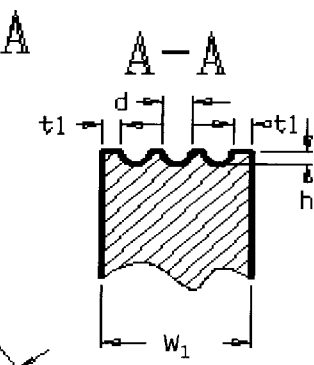

FRICTIONALLY WELDED THERMOPLASTIC ARTICLES HAVING IMPROVED STRENGTH

CROSS-REFERENCES TO RELATED APPLICATIONS

This application is related to application Ser. No. 09/443,595 filed Nov. 15, 1999, entitled "Multi-Purpose Universal Weld Test System", U.S. Pat. No. 6,193,133.

BACKGROUND OF THE INVENTION

1. Field of the Invention

The present invention relates to welding of thermoplastic articles; and more particularly, to a thermoplastic article comprising a frictionally welded butt joint having improved strength and a method for forming the welded joint.

2. Description of the Prior Art

Frictional welding of thermoplastic components is well established in the art. Frictional welding includes the techniques of linear vibration welding, orbital welding and spin welding. In each of these techniques, the process is accomplished by placing the two workpieces to be welded in stacked, juxtaposed relation, applying a compressive force between the workpieces and then applying a vibrational, orbital or rotational motion of the workpieces relative to one another in the plane of the interface between the two. Frictional heating of the interface causes melt down and flow of the thermoplastic material in a melt zone. Upon cessation of motion, and subsequent cooling under pressure, solidification of the material in the melt zone forms a welded joint between the workpieces.

Parts to be welded frequently are of different thicknesses. Typically, one part may be 2 to 4 mm thick and the other part 4 to 6 mm thick in the region of the weld area.

The phenomenology of the vibration welding process has been described and analyzed. See V. K. Stokes, "Vibration Welding of Thermoplastics, Part I: Phenomenology of the Welding Process", *Polymer Engineering and Science,* 28, 718 (1988); "Vibration Welding of Thermoplastics, Part II, Analysis of the Welding Process", *Polymer Engineering and Science,* 28, 728 (1988). Stokes described the welding process as occurring in four phases:

1) Heating of the interface by friction;
2) Melting and flow outward in a direction lateral to the vibratory motion;
3) A steady state at which the melting rate of the solid equals the outflow of the molten material; and
4) Solidification of the molten material when the vibratory motion is stopped.

The molten material squeezed out of the joint during the welding operation is variously called "flash" or "flush". If the appearance of the flash is objectionable in the finished part, a separate operation may remove the flash after welding. Alternatively, the parts to be welded may incorporate "flash traps" which hide the flash from view.

The strength of the frictionally welded zone is a complex function of a number of parameters. Among these are the vibrational frequency, the amplitude and direction of the vibratory motion (longitudinal, lateral, angular, orbital), the pressure normal to the interface between the workpieces, the weld time or the weld penetration (melt down) and the hold or cooling time. The effects of some of these parameters on the strengths of several unfilled thermoplastics has been reported by V. K. Stokes in "Vibrational Welding of Thermoplastics, Part IV: Strengths of Poly(Butylene Terepthalate), Polyetherimide and Modified Polyphenylene Oxide Butt Welds" *Polymer Engineering and Science,* 28, 998 (1988).

For many applications, such as automotive under-the hood applications, power tools and others, it is necessary to incorporate reinforcing fibers in the base thermoplastic materials. These reinforcing fibers, such as glass, carbon, metal, aramid or other fibers, greatly increase the strength, stiffness and heat distortion temperature of the base resins. The presence of these reinforcing fibers affects and complicates the relationships between the welding processing parameters and the strengths of the welds in the thermoplastic materials to be joined. V. Kagan et. al. described the vibration welding of such filled thermoplastics in "The Optimized Performance of Linear Vibration Welded Nylon 6 and Nylon 66 Butt Joints", Plastics-Racing into the Future, *Proceedings of the SPE 54th Annual Technical Conference and Exhibits,* p.1266–1274, 1996 and also in U.S. Pat. No. 5,874,146, which publications are herein incorporated by reference thereto. It was found that under optimized welding processing conditions such that fibers from one of the workpieces penetrated both into the weld, and into the other workpiece, the welds reached a maximum tensile strength. Under less than optimal processing conditions, the reinforcing fibers failed to bridge the weld region, and consequently the strengths of the welds were lower.

In each of the above studies, the workpieces to be welded had strictly planar opposing surfaces. No suggestion was made that other than planar initial interfacial geometries could be of advantage. Indeed, in "Vibration Welding of Thermoplastics, Part I: Phenomenology of the Welding Process", *Polymer Engineering and Science,* 28, 718 (1988) at P. 718, first column, second paragraph, the author states, "The vibration welding process is ideally suited to the welding of thermoplastic parts along relatively flat seams. The process can also accommodate seams whose out-of-plane curvature is small." Thus, the author indicates that non-planar longitudinal interfaces are disadvantages to be "accommodated". No comments were made about the cross-sectional geometry of the parts to be welded.

The method and articles of the present invention are to be contrasted with ultrasonic welding and ultrasonically welded articles. In ultrasonic welding, vibration is imparted in a direction normal to the weld plane rather than in the plane of the weld, commonly using an ultrasonic horn. An ultrasonic horn is a relatively low energy source. Consequently, in contrast to frictional welding, ultrasonic welding is appropriate only for relatively small parts or for spot welding.

In order that the ultrasonic energy absorbed by the workpieces is sufficient to cause local melting, it is necessary to concentrate the energy flux. This is done by use of a projection, also known as an "energy director" on the mating surface of one of the workpieces. See for example U.S. Pat. No. 4,618,516.

An energy director or projection in ultrasonic welding is a means of concentrating the energy flux. In the design of parts to be ultrasonically welded, a single longitudinal energy director (small or large) is most commonly used (See "Specification for Standardized Ultrasonic Test Specimen for Thermoplastics", *American Welding Society, AWS G1.2m/G1.2:* 1999, *An American National Standard,* part 5, page 3). Although more than one energy director may be used under special circumstances, it is not usually done, for the reason that more than one energy director disperses the already weak energy source and makes welding more difficult and slower. An exception may be found in U.S. Pat.

No. 5,540,808 where dual energy directors were used to weld a rigid material to an easily melted, flexible material. As will be seen, the geometry, purpose and function of these energy directors differ from the geometry, purpose and function of the rectangular edge projections of the present invention.

It would be desirable to provide a method of welding thermoplastic articles to obtain high strength bonds under less than optimum conditions. It would be further desirable if this method were suitable for welding rigid, fiber reinforced thermoplastics. It would be yet further desirable if the method were suitable for forming welds of substantial dimension. Especially needed are strong, frictionally welded, rigid, fiber reinforced thermoplastic articles.

SUMMARY OF THE INVENTION

The invention provides a frictionally welded, reinforced thermoplastic article having improved strength. This is accomplished by restricting lateral flow of molten material out of the gap between the workpieces sufficient to maintain a molten pool of substantial depth from the beginning of melting to the onset of solidification. The restriction to lateral flow of material out of the gap between the workpieces is provided by dams (projections) of essentially rectangular cross-section at each lateral edge of one of the workpieces, while the other workpiece has a substantially flat mating surface.

Generally stated, the invention provides a frictionally welded thermoplastic article comprising a first thermoplastic workpiece and a second thermoplastic workpiece. Each of said first and second thermoplastic workpieces have a mating surface. The mating surface of the first thermoplastic workpiece and the mating surface of the second thermoplastic workpiece are joined in a melt down region. Prior to welding, the mating surface of the first workpiece has been comprised of a restriction to lateral flow of the melt from between the workpieces. The mating surface of said second workpiece is substantially flat.

More specifically, there is provided in accordance with the invention, a vibration welded thermoplastic article, comprising: a first thermoplastic workpiece and a second thermoplastic workpiece, each of said first and thermoplastic workpieces having a mating surface; said mating surface of said first thermoplastic workpiece and said mating surface of said second thermoplastic workpiece being joined in a melt down region; said mating surface of said first workpiece having been comprised, prior to welding, of a restriction to lateral flow of the melt from between the workpieces, and said mating surface of said second workpiece being substantially flat; wherein the restriction to lateral flow of the melt from between the workpieces is a substantially rectangular projection along each lateral edge of the first workpiece; wherein the thickness of each of said projections is between about 5% and about 35% of the thickness of the first workpiece; and the height of each of said projections, relative to the lowest point on the initial mating surface is at least about 25% of the dimension of the melt down region.

In addition there is provided by the invention, a vibration welded thermoplastic article, comprising: a first thermoplastic workpiece and a second thermoplastic workpiece, each of said first and thermoplastic workpieces having a mating surface; said mating surface of said first thermoplastic workpiece and said mating surface of said second thermoplastic workpiece being joined in a melt down region; said mating surface of said first workpiece having been comprised, prior to welding, of a restriction to lateral flow of the melt from between the workpieces, and said mating surface of said second workpiece being substantially flat; wherein the restriction to lateral flow of the melt from between the workpieces is a substantially rectangular projection along each lateral edge of the first workpiece; wherein the thickness of each of said projections is between about 5% and about 35% of the thickness of the first workpiece; and prior to welding, the cross-sectional area of the space defined by a line between the upper edges of the rectangular projections and the material surfaces between them is at least about 15% of the product of the thickness of the first workpiece and the dimension of the melt down region.

The invention further provides a method for preparing frictionally welded, reinforced thermoplastic articles of improved strength by restricting the lateral flow of molten material out of the gap between them, thereby retaining a molten pool of substantial depth between them from the beginning of melting to the onset of solidification.

Frictional welding of a first thermoplastic workpiece to a second thermoplastic workpiece is accomplished by a method comprising the steps of: pressing the first and second workpieces together under a compressive clamping pressure; moving the first workpiece relative to the second workpiece in a plane parallel to their interface sufficient to frictionally heat the interface; melting the interfacial surfaces of the first and second workpieces creating a melt down region; providing a means to restricting the lateral flow of molten material out of the gap between said interfacial surfaces; and retaining a molten pool of substantial depth between the workpieces from the beginning of melting to the onset of solidification.

The articles of this invention exhibit improved utility for automotive applications such as air intake manifolds, car cross-beams, resonators, fluid reservoirs, and air filter housings. Such articles are well suited for use in many other applications such lawn and garden equipment and power tools.

BRIEF DESCRIPTION OF THE DRAWINGS

The invention will be more fully understood and further advantages will become apparent when reference is had to the following detailed description and the accompanying drawings, wherein like reference numerals denote similar elements throughout the several views and in which:

FIG. 1a is a perspective view of a first workpiece having a flat surface to be mated with second workpiece (not shown) also having a flat mating surface;

FIG. 1b is a sectional view of this first workpiece along line A—A. The interface geometry illustrated in FIG. 1a and 1b is a comparative example.

FIG. 2a is a perspective view of a first workpiece having triangular "teeth" running along the surface to be mated with a second workpiece (not shown) having a flat mating surface;

FIG. 2b is a sectional view of the first workpiece shown in FIG. 2a along line A—A. The interface geometry illustrated in FIGS. 2a and 2b is a comparative example.

FIG. 7a is a perspective view of a first workpiece having a rectangular projection at each edge of its lateral faces and two semi-circular grooves between said rectangular projections along the surface to be mated, the mating surface of the first workpiece having an undulation or wave along its length, and the first workpiece being adapted to mate with a second workpiece (not shown) having a substantially flat mating surface;

FIGS. 7b and 7c are sectional views of the first workpiece shown in FIG. 7a along lines A—A and B—B, respectively. The interface geometry illustrated in FIGS. 7a, 7b and 7c is an example of the invention.

FIG. 8a is a perspective view of a first workpiece having a rectangular projection at each edge of its lateral faces and multiple grooves between said rectangular projections along the surface to be mated with a second workpiece (not shown) having a substantially flat mating surface;

FIG. 8b is a sectional view of the first workpiece shown in FIG. 8a along line A—A.

The interface geometry illustrated in FIGS. 8a and 8b is an example of the invention.

Figure 9:
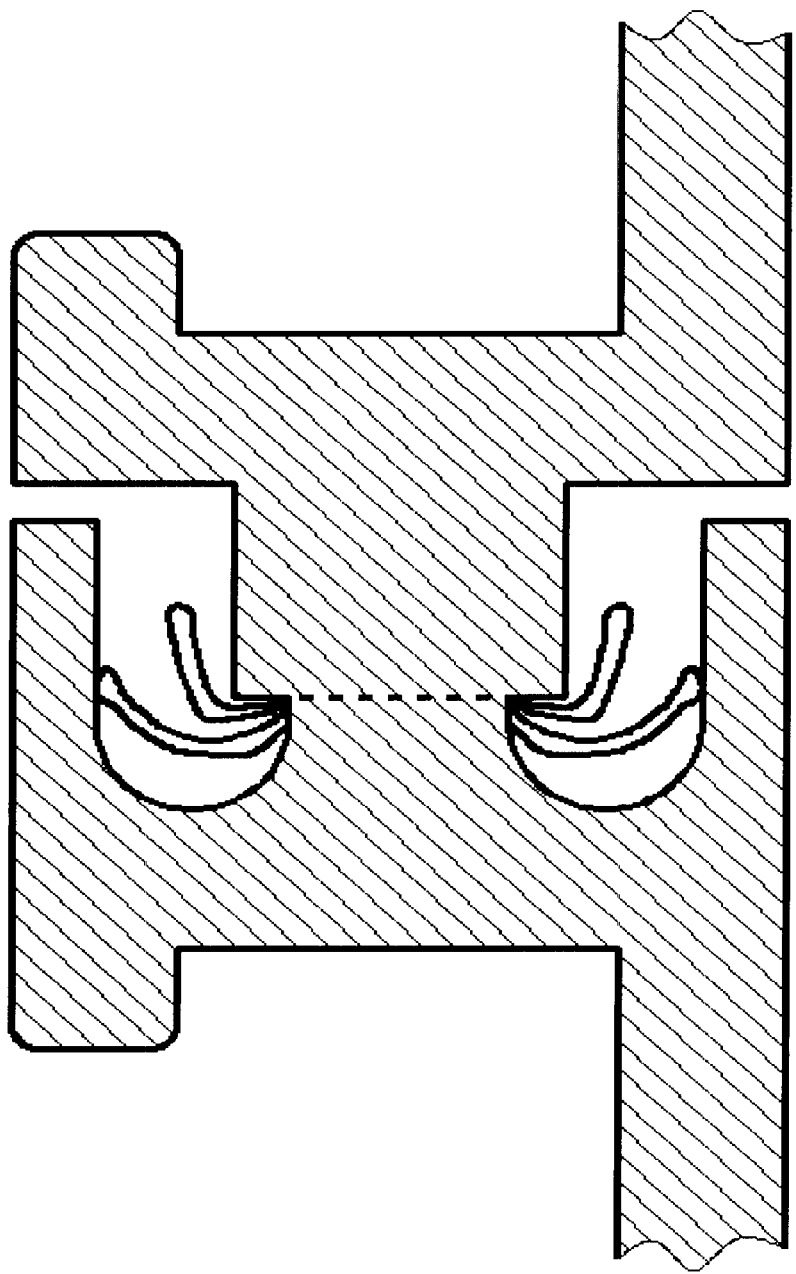
Figure 10:
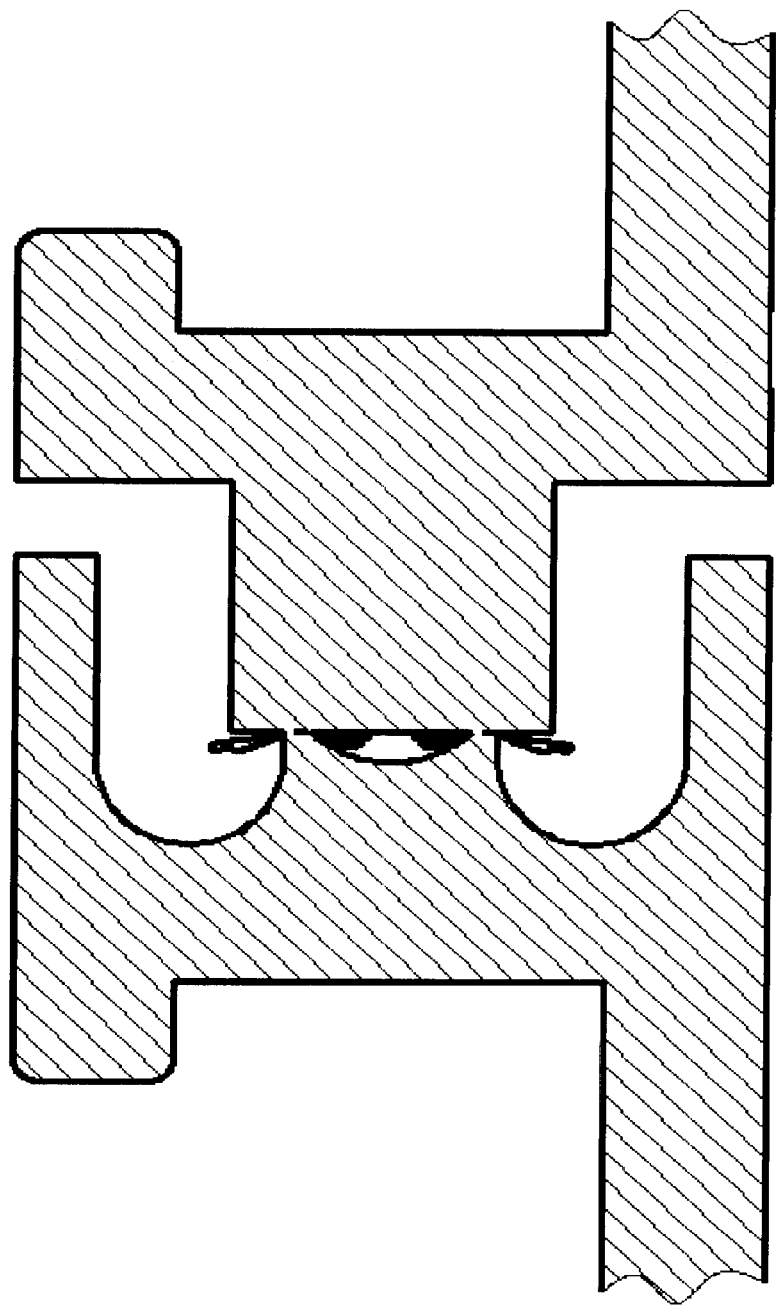

FIG. 9 is a sectional view of a prior art complex butt joint with flash traps, the section schematically illustrating the large amount of flash produced when flat surfaces are frictionally welded;

FIG. 10 is a sectional view of a complex butt joint of the invention, the section schematically illustrating how the flash is reduced and a molten pool is retained in the region between rectangular edge projections.

DETAILED DESCRIPTION OF THE INVENTION

The invention provides a frictionally welded, reinforced thermoplastic article of improved strength by means of restriction to lateral flow of molten material out of the gap between the workpieces, thereby maintaining a molten pool of substantial depth from the beginning of melting to the onset of solidification. Specifically, the restriction to lateral flow of material out of the gap between the workpieces is provided by dams (projections) of essentially rectangular cross-section at each lateral edge of one of the workpieces, while the other workpiece has a substantially flat mating surface.

The invention also provides a method for preparing friction welded, filled reinforced thermoplastic articles of improved strength by restricting the lateral flow of molten material out of the gap between them, thereby retaining a molten pool of substantial depth between them from the beginning of melting to the onset of solidification.

Techniques of frictional welding and apparatus for conducting frictional welding are well known in the art. Frictional welders (linear, orbital, spin) are commercially available from several multi-national companies (Branson Ultrasonics, Forward Technologies, Inc., Bielomatik, etc.) in North America, Europe, Asia, etc. For example, Branson Ultrasonics Corporation, Danbury, Conn., manufactures linear vibration welding machines designated as a Mini-Vibration Welder II, Ultra HY-Line model VW/8UH, and 90 series Vibration Welders model VW/6.

Frictional welding may be conducted by placing a first thermoplastic workpiece and a second thermoplastic workpiece into contact under a compressive clamping pressure. The mating surfaces are kept at a predetermined clamping pressure, for example by positioning them on a platform under pressure applied by air or hydraulic cylinders. Motion is then imparted to one surface with respect to the other surface to create a frictional rubbing which generates heat, melts the surfaces and blends and fuses the thermoplastic materials from the first and second workpieces in a "melt down" region. The dimension of the melt down region is measured by the linear motion of the opposing platforms providing the clamping pressure and can be controlled by appropriate machine settings.

Clamping pressure is one of the more important parameters. When the thermoplastic materials are reinforced with short fibers, such as glass, carbon, aramid or other fibers, the manner of blending the materials from the opposing workpieces becomes very important. Prior to welding, the fibers in the thermoplastic materials typically are oriented randomly, i.e. have no preferred orientation. However, if careful attention is not paid to the conditions of welding, the relative motion can cause the fibers in the weld region to become oriented only within the plane of the weld. This leads to lower strength and mechanical performance than if the conditions of welding are optimized so as to cause the fibers to penetrate both into the weld and into the opposing workpiece.

Unfortunately, optimized welding conditions cannot always be achieved. The magnitude of the necessary compressive clamping pressure depends on the sizes and geometries of the plastic parts and upon the dimensional stability of the thermoplastics during previous molding operations. In practice, the workpieces to be joined are frequently molded with bosses, walls and ribs that cause differential shrinkage and warpage of the surfaces to be mated. Many applications require the welded joint to be hermetically sealed. Under these circumstances, much higher than optimum clamping pressures must be used to bring the mating surfaces into uniform contact. This higher than optimum clamping pressure increases the shear stresses at the interface, accentuates the tendency for the fibers to become oriented in the plane of the weld, and reduces the tensile strength achieved.

This sensitivity of weld strength to clamping pressure is illustrated by the data in Table 1 below obtained with planar interface geometries on each workpiece. The welds of Table 1 were prepared by longitudinal vibration welding in a Branson Ultrasonic Corp., Mini Welder II at a nominal frequency of 240 Hz, a vibration amplitude of 1.8 mm and a melt down of 1.5 mm. The material used was a Capron® nylon 6 from Honeywell International Inc., Morristown, N.J.

TABLE 1

Influence of Clamping Pressure (MPa) on Weld Tensile Strength at Room Temperature Capron ® 8233G HS BK-102, nylon 6, 33 wt. % Glass-Fiber Reinforced

| Clamping Pressure, MPa | Tensile Strength of Weld MPa |
| --- | --- |
| 0.66 | 73.7 |
| 0.86 | 85.2 |
| 1.28 | 80.3 |
| 2.17 | 77.6 |
| 3.5 | 65 |
| 5.6 | 58.2 |
| 6.4 | 46.8 |

Without being bound by any particular theory, it is hypothesized that the effect of higher than optimal clamping pressure has an effect similar to having a weld interface thickness which is too low, and which may result in insufficient space for fiber rotation and hence restrain fibers from crossing the interface and penetrating into the opposing workpiece.

To counter this tendency, in this invention the initial interfacial geometry was configured to restrict the lateral flow of molten material out of the gap between the workpieces, thereby maintaining a molten pool of substantial depth from the beginning of melting to the onset of solidification (Compare FIGS. 9 and 10).

According to the invention, the two thermoplastic workpieces to be welded are composed of any compatible thermoplastic polymeric material. Suitable thermoplastic polymers nonexclusively include polyamides, polyesters, polycarbonates, polysulfones, polyimides, polyurethanes, polyethers, polyolefins, vinyl polymers, and mixtures thereof. Polyamides such as nylon 6 and nylon 66 for example Capron® 8233G HS nylon 6 and Capron® 5233G HS nylon 66 from Honeywell International of Morrristown, N.J. and polyesters such as Petra® 130 polyethylene terepthalate available from Honeywell International are most preferred. Dissimilar thermoplastic materials may be used provided they blend compatibly. At least one and preferably both of the thermoplastic materials are fiber reinforced. Suitable reinforcing fibers non-exclusively include material which do not soften, i.e. lose their rigidity, at temperatures typically used for injection molding, such as temperatures up to about 400° C. Preferably the fiber reinforcement comprises such a material as glass, carbon, silicon, metals, minerals, polymeric fibers and mixtures thereof. Glass fiber reinforcement is most preferred. In the preferred embodiment, the fiber is rigid and has a diameter of from about 8 to about 12 micrometers, preferably from about 9 to about 11 micrometers and most preferably about 10 micrometers. The preferred fiber length is from about 120 to about 300 micrometers, more preferably from about 130 to 250 micrometers and most preferably from about 140 to about 200 micrometers. In the preferred embodiment the fibers comprise from about 6 to about 63 weight percent (wt. %) of the thermoplastic composition and more preferably from about 10 to about 40 wt. % and most preferably from about 14 to 25 wt. %.

According to the invention, a first workpiece possesses an initial mating surface comprising projections of essentially rectangular cross-section at each lateral edge. The thickness of the projections are proportioned in relationship to the thickness of the workpiece. The thickness of each projection (dimension t in FIGS. 4–7; dimension $t_1$ in FIG. 8) is typically between about 5% and about 35% of the thickness of the workpiece (dimension $W_1$ in FIGS. 4–8).

$t/W_1$=0.05 to 0.35; $t_1/W_1$=0.05 to 0.35

Preferably, the thickness of each projection will be between about 10% to about 20% of the thickness of the workpiece.

$t/W_1$=0.10 to 0.20; $t_1/W_1$=0.10 to 0.20

The height of each projection (h in FIGS. 4–8) relative to the lowest point on the initial mating surface should be in proportion to the desired melt down (MD). The height of each projection is typically at least about 25% of the melt down and preferably at least about 33% of the melt down.

$h/MD \geq 0.25$; Preferably, $h/MD \geq 0.33$

Alternatively, the geometry of the initial mating surface of the first workpiece can be defined in terms of the volume of the largest melt pool that can be contained relative to the maximum volume of melt produced by welding. The volume of the largest melt pool that can be contained between the rectangular edge projections is equal to the length of the workpiece times the cross-sectional area of the region defined by the horizontal line between the upper edges of the rectangular projections and the boundaries of the space defined by the rectangular projections and the material surface between them. Call this cross-sectional area A. The maximum volume of melt produced by welding is the length of the workpiece times the melt down (MD) times the thickness of the workpiece ($W_1$). Therefore, the volume of the largest melt pool that can be contained between the rectangular projections in relation to the largest volume of melt produced by welding is A/(MD×$W_1$). According to the invention this proportion is at least about 0.15 (15%) and preferably is at least about 0.20 (20%).

$A/(MD \times W_1) \geq 0.15$; Preferably, $A/(MD \times W_1) \geq 0.20$

It is also contemplated that in addition to the essentially rectangular projections at each lateral edge, the first workpiece may have an undulation or wave along its length. The amplitude of this undulation (peak-to-trough) is from about 20% to about 800% of the melt down.

The second workpiece will have a substantially flat mating surface. In the context of this invention, a substantially flat mating surface is one that maintains restriction of melt flow from between the mating surfaces of the two workpieces. The second workpiece may have a some convexity or concavity so long as the departure from planarity is less than about 1 mm, preferably less than about 0.5 mm in the region where it will abut the rectangular projections of the first workpiece.

The following non-limiting examples serve to illustrate the invention. It will be recognized that variations in elements and proportions may be made by those skilled in the art without departing from the scope of the present invention.

EXAMPLES AND COMPARATIVE EXAMPLES

A series of linear vibration welded articles were prepared from injection molded plaques of different fiber reinforced thermoplastic materials, and of different initial interface geometries, all using the following constant conditions:

Type of Joint: Butt Joint with same thermoplastic
Welder/Welding Machine: Branson Ultrasonic s Corp., Model Mini Welder II
Initial Dimensions of Molded Plaques:
  First Workpiece: Width ($W_1$)×Length (L)×Thickness(T): 15.24 cm×6.35 cm×0.396 cm
  Second Workpiece: Width ($W_2$)×Length (L)×Thickness (T): 15.24 cm×6.35 cm×0.624 cm
Dimensions of Welded Plaques: (W×L): 15.24 cm×12.7 cm
Initial Interface Design of Workpiece 1: See Table 2
Initial Interface Design of Workpiece 2: Flat
Welding Conditions
  Vibration Frequency: 240 Hz (nominal)
  Vibration Amplitude: 1.77 mm
  Weld clamping pressure: 3 MPa
  Vibration Direction: Width of plaques (longitudinal)
  Welding Environment: Std. Lab. Atmosph., 23° C., 50 ±5% R.H.
  Melt-down: 1.5 mm
Thermoplastic Materials
  Capron® 8233G HS nylon 6, 33 wt. % glass fiber
  Capron® 8267G, nylon 6, 15 wt. % glass fiber+25 wt. % mineral fillers
  Capron® RX-1104, nylon 6, 33 wt. % glass fiber
  Zytel® 70G33 HS1L (DuPont), nylon 66, 33 wt. % glass fiber The welded plaques were cut into 1.27 cm wide strips (rectangular specimens) and the tensile strengths of the welded joints were determined by the ISO 527/ASTM D 638 testing method for plastics at a strain rate of 5 mm/min, at room temperature 23° C.

The tensile strengths determined for the comparative examples and the examples of the invention as shown in the Figures are presented in Table 2 below.

lateral edge of one of the workpieces while the other workpiece has a substantially flat mating surface. This can be seen in several ways.

The examples of the invention (Examples 1 and 2) had superior strength to Comparative Example 1 where the initial mating surfaces were flat on both workpieces. The examples of the invention had superior strength to Comparative Example 2, which had "teeth"-like projections at each edge of the initial mating surfaces. The greatest difference of all was between the examples of the invention and Comparative Example 3. In Comparative Example 3, the first workpiece had a convex "bump" which tended to accelerate melt out of the gap between the workpieces.

Example 3

Figure 6:
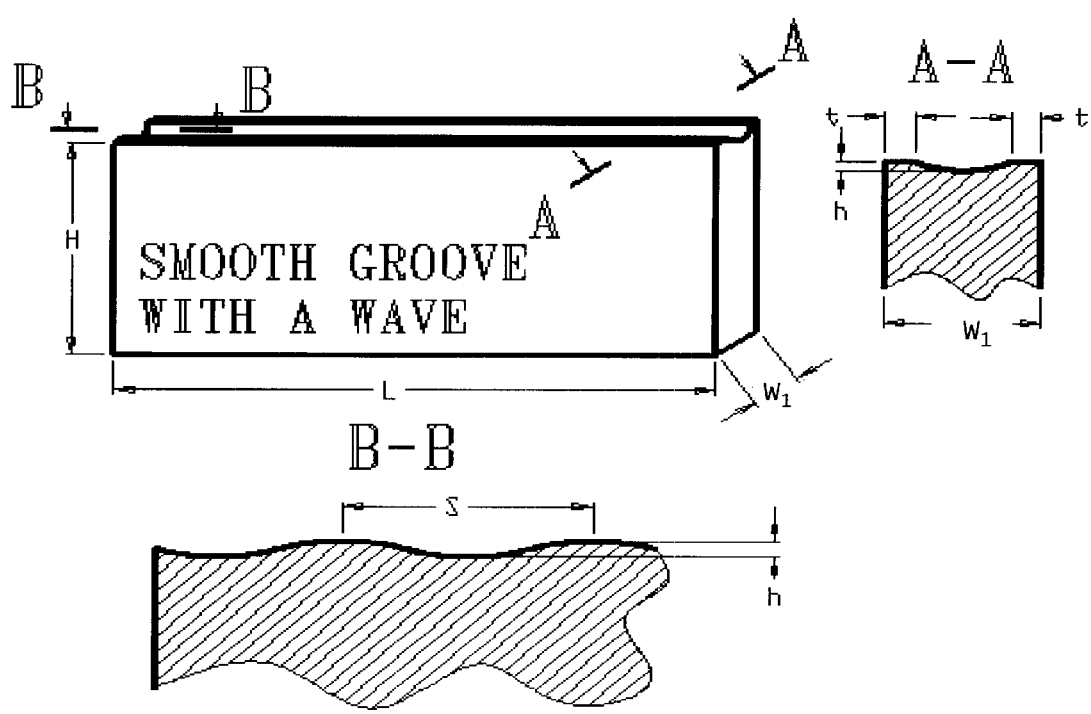
FIG. 6a is a perspective view of a first workpiece having a rectangular projection at each edge of its lateral faces and a smooth groove between said rectangular projections along the surface to be mated, mating surface of the first workpiece having an undulation or wave along its length, and the first workpiece being adapted to mate with a second workpiece (not shown) having a substantially flat mating surface.
FIGS. 6b and 6c are sectional views of this first workpiece along lines A—A and B—B, respectively. The interface geometry illustrated in FIGS. 6a, 6b and 6c is an example of the invention.

Welded plaques are formed as in Examples 1 and 2 above using the workpiece design of FIG. 6. The tensile strengths of the welded joints are improved relative to those of Comparative Example 1.

Example 4

Welded plaques are formed as in Examples 1 and 2 above using the workpiece design of FIG. 7. The tensile strengths of the welded joints are improved relative to those of Comparative Example 1.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A frictionally welded thermoplastic article, comprising:
   a. a first thermoplastic workpiece and a second thermoplastic workpiece, each of said first and thermoplastic workpieces having a mating surface, and at least one of said first and second workpieces being comprised of a fiber reinforced thermoplastic;
   b. said mating surface of said first thermoplastic workpiece and said mating surface of said second thermoplastic workpiece being joined in a melt down region;
   c. said mating surface of said first workpiece having been comprised, prior to welding, of a restriction to lateral flow of the melt from between the workpieces, and said

TABLE 2

Tensile Strength of Welded Joints vs. Interface Design

Figure 3:
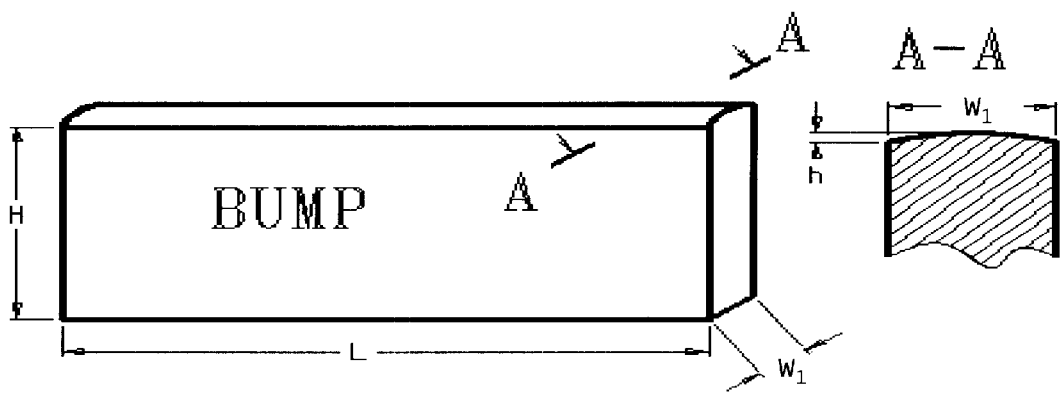
FIG. 3a is a perspective view of a first workpiece having a convex "bump" along the surface to be mated with a second workpiece (not shown) having a flat mating surface.
FIG. 3b is a sectional view of the first workpiece shown in FIG. 3a along line A—A. The interface geometry illustrated in FIGS. 3a and 3b is a comparative example.
Figures 4, 4A, 4B:
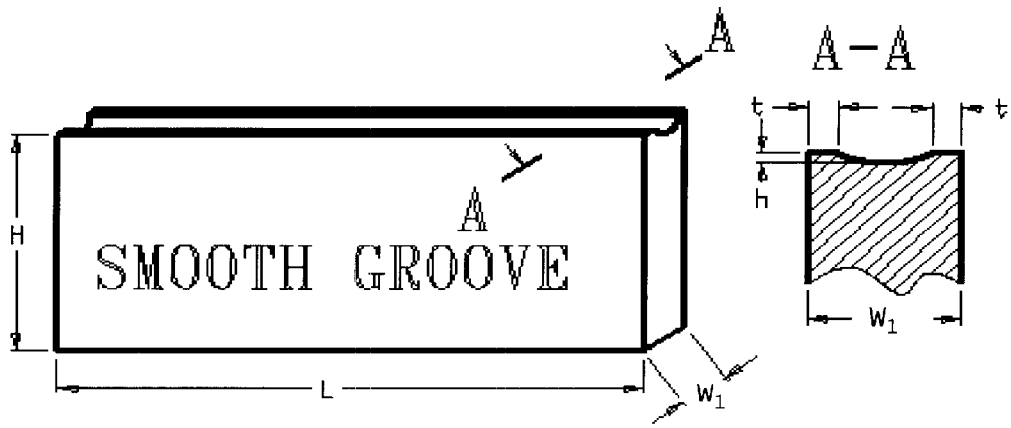
FIG. 4a is a perspective view of a first workpiece having a rectangular projection at each edge of its lateral faces and a smooth groove between said rectangular projections along the surface to be mated with a second workpiece (not shown) having a substantially flat mating surface.
FIG. 4b is a sectional view of the first workpiece shown in FIG. 4a along line A—A. The interface geometry illustrated in FIGS. 4a and 4b is an example of the invention.
Figures 5, 5A, 5B:
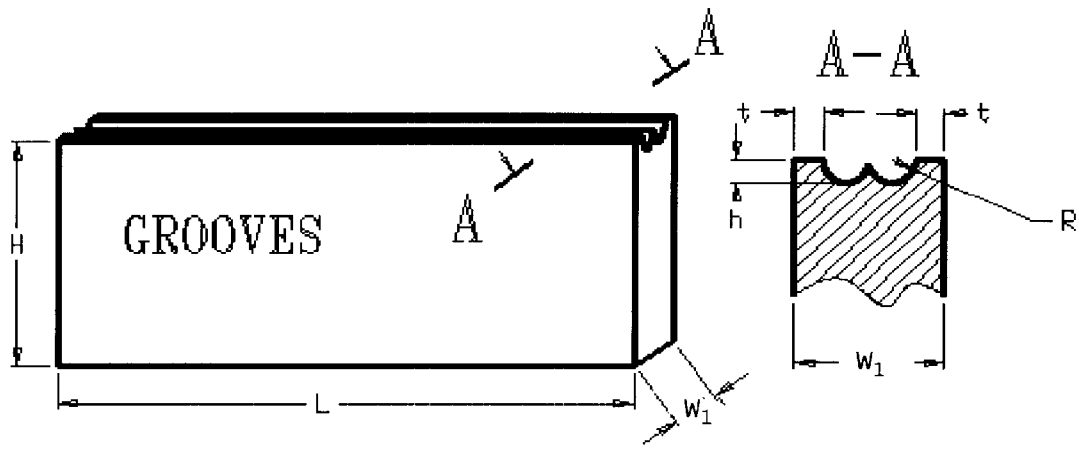
FIG. 5a is a perspective view of a first workpiece having a rectangular projection at each edge of its lateral faces and two semi-circular grooves between said rectangular projections along the surface to be mated with a second workpiece (not shown) having a substantially flat mating surface.
FIG. 5b is a sectional view of the first workpiece shown in FIG. 5a along line A—A. The interface geometry illustrated in FIGS. 5a and 5b is an example of the invention.

| | Tensile Strength of Welded Joints, MPa Design of Workpiece 1 | | | | |
|---|---|---|---|---|---|
| | Comparative Example 1 "Flat" FIG. 1 | Comparative Example 2 "Teeth" FIG. 2 | Comparative Example 3 "Bump" FIG. 3 | Example 1 "Smooth Groove" FIG. 4 | Example 2 "Grooves" FIG. 5 |
| $t/W_1$ | — | — | — | 0.19 | 0.13 |
| h/MD | — | — | — | 0.33 | 0.42 |
| $A/(W_1 \times MD)$ | — | — | — | 0.24 | 0.21 |
| Material | | | | | |
| Capron ® 8233G HS | 69.03 | 70.09 | 67.64 | 76.08 | 74.95 |
| Capron ® 8267G HS | 72.63 | 73.66 | 73.18 | 77.04 | 79.07 |
| Capron ® RX-1104 | 66.91 | 69.76 | 59.06 | 71.99 | 72.78 |
| Zytel ® 73G30H3 1L | 71.90 | 75.77 | 72.57 | 76.56 | 75.96 |
| AVERAGE | 70.12 | 72.32 | 65.11 | 75.42 | 75.69 |
| Relative Tensile Strength | 1.00 | 1.03 | 0.97 | 1.08 | 1.08 |

An analysis of variance of the tensile data shows a highly significant difference between the tensile strengths of the examples of the invention and the comparative examples. This statistically significant difference is also highly advantageous from a technological point of view.

The data illustrate the benefits of configuring the initial interface design to restrict the lateral flow of melt out of the gap between the workpieces through the use of dams (projections) of essentially rectangular cross-section at each mating surface of said second workpiece being substantially flat;

d. wherein the restriction to lateral flow of the melt from between the workpieces is a substantially rectangular projection along each lateral edge of the first workpiece;

e. wherein the thickness of each of said projections is between about 5% and about 35% of the thickness of the first workpiece; and f. the height of each of said projections, relative to the lowest point on the initial mating surface is at least about 25% of the dimension of the melt down region.

2. An article as recited by claim 1, wherein the mating surface of the first workpiece has an undulation or wave along its length having an amplitude (peak-to-trough) less than about 800% of the melt down.

3. An article as recited by claim 1, wherein each of said first and second thermoplastic workpieces comprises a thermoplastic polymer selected from the group consisting of polyamides, polyesters, polycarbonates, polysulfones, polyimides, polyurethanes, polyethers, polyolefins, vinyl polymers and mixtures thereof.

4. A frictionally welded thermoplastic article as recited by claim 3, wherein each of said first and second workpieces is comprised of a fiber reinforced thermoplastic.

5. An article as recited by claim 1, wherein the fiber comprises a material having a melting point at least 50° C. higher than the thermoplastic polymer which it reinforces.

6. A vibration welded thermoplastic article, comprising:

a. a first thermoplastic workpiece and a second thermoplastic workpiece, each of said first and thermoplastic workpieces having a mating surface, and at least one of said first and second workpieces being comprised of a fiber reinforced thermoplastic;

b. said mating surface of said first thermoplastic workpiece and said mating surface of said second thermoplastic workpiece being joined in a melt down region;

c. said mating surface of said first workpiece having been comprised, prior to welding, of a restriction to lateral flow of the melt from between the workpieces, and said mating surface of said second workpiece being substantially flat;

d. wherein the restriction to lateral flow of the melt from between the workpieces is a substantially rectangular projection along each lateral edge of the first workpiece;

e. wherein the thickness of each of said projections is between about 5% and about 35% of the thickness of the first workpiece; and f. prior to welding, the cross-sectional area of the space defined by a line between the upper edges of the rectangular projections and the material surfaces between them is at least about 15% of the product of the thickness of the first workpiece and the dimension of the melt down region.

* * * * *